Patented July 17, 1934

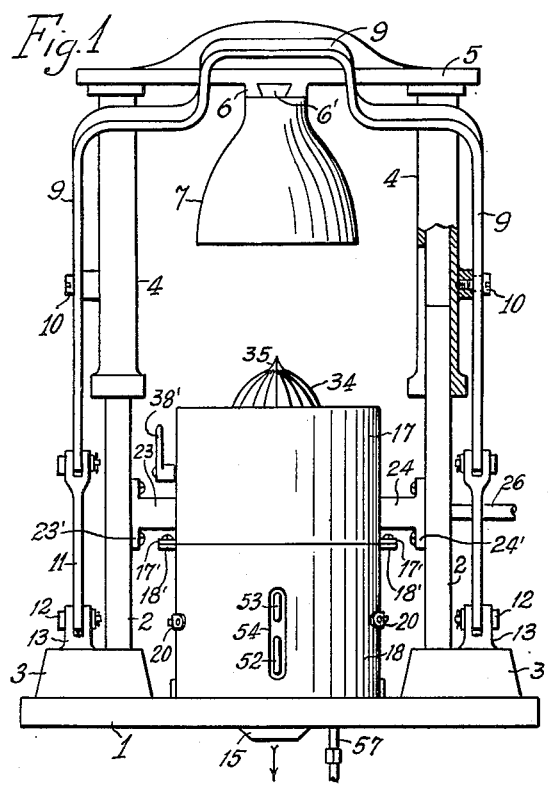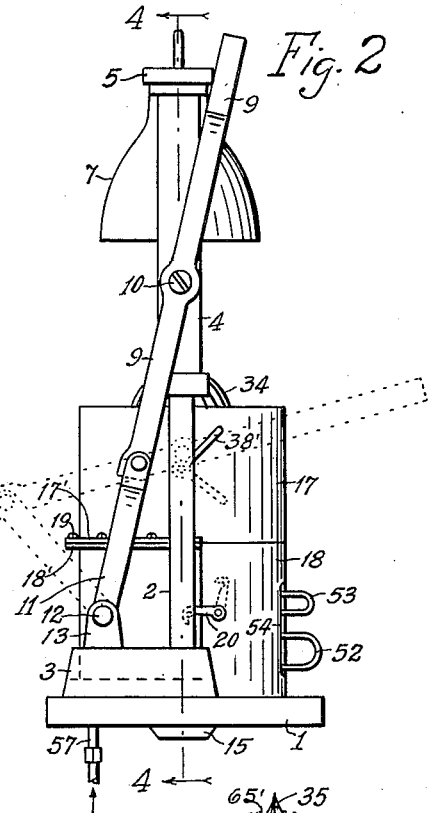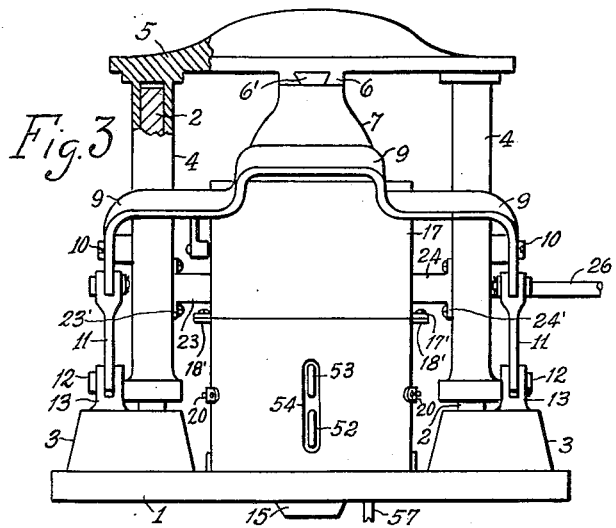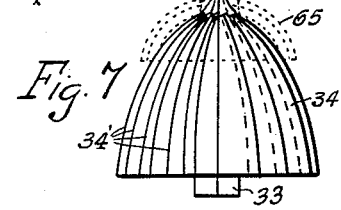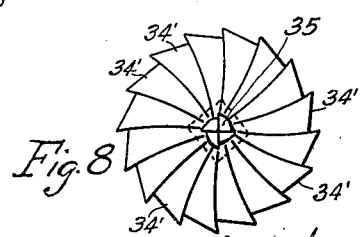

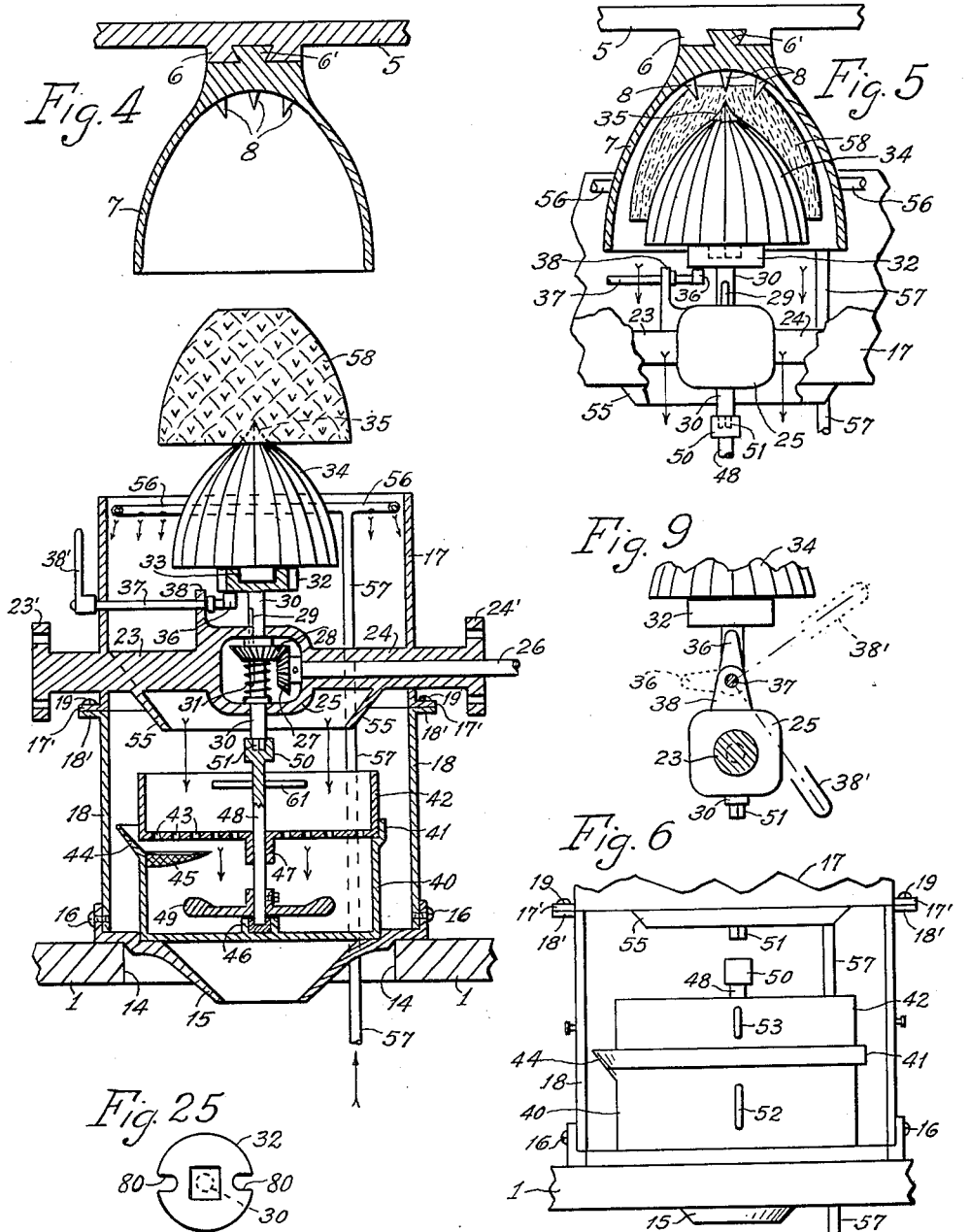

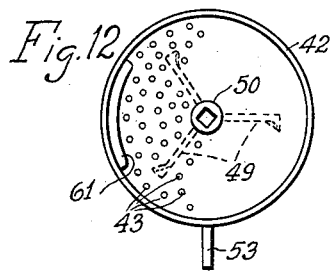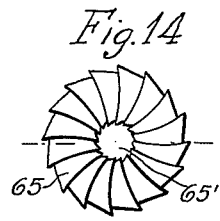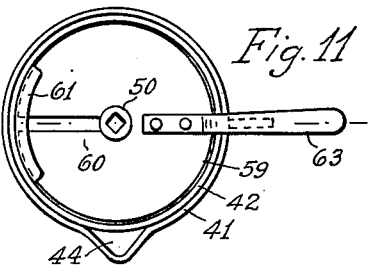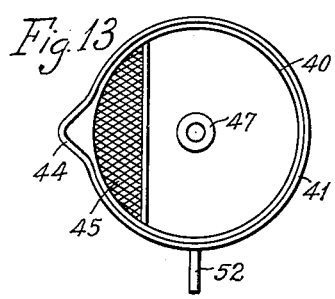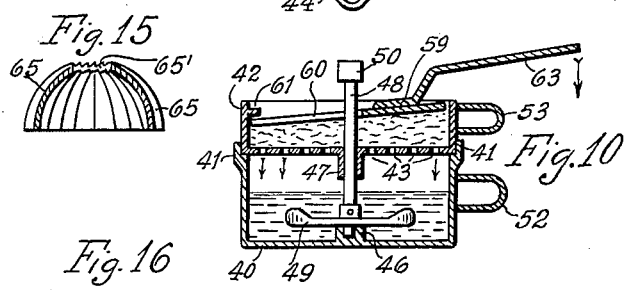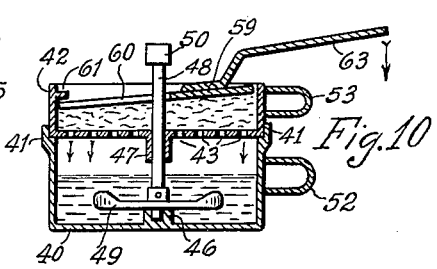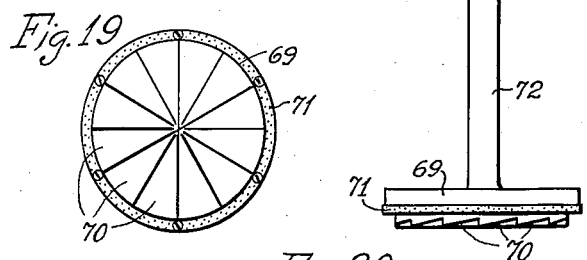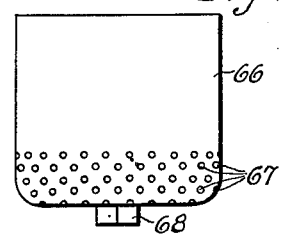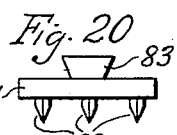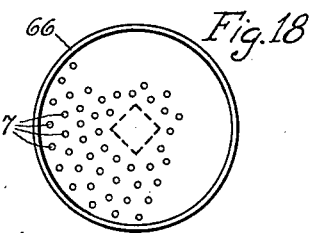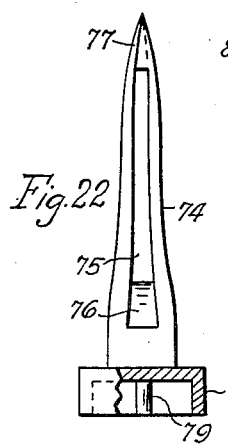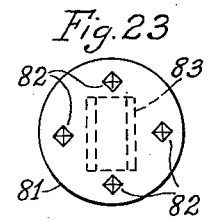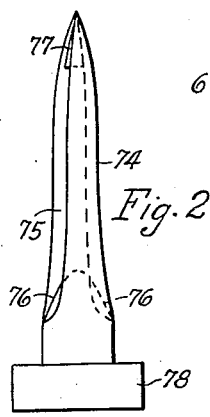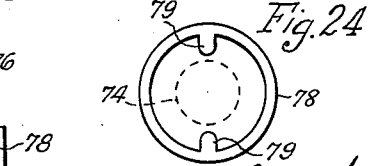

1,966,978

UNITED STATES PATENT OFFICE 1,966,978

APPARATUS FOR EXTRACTING FRUIT JUICE

Santiago Estrada, Enrique Mauri, and Armando Ivey, Habana, Cuba

Application July 6, 1933, Serial No. 679,250
In Cuba April 10, 1933

2 Claims. (Cl. 146—3)

This invention relates to an apparatus for extracting fruit juice, and it has for its object to provide an apparatus of that kind in which the fruit to be squeezed is subjected at the same time to a compression and to a rotatory grating action which completely reduces the fruit to pulp, thus facilitating the whole extraction of the juice, even from its core. This apparatus also has the advantage that by means of the substitution of certain pieces, it permits to accomplish distinctly the extraction of the juice of fruits of different texture, as well as of skinned and non-skinned fruits, and even the extraction of the juice of certain fruits, like the coconut, which do not require to be compressed but simply punctured, this apparatus being so constructed and arranged that it can be handled by any person without fear for complications of any sort.

The invention is described with reference to the figures of the annexed drawings, of which:

Fig. 1 is a front elevation view of the apparatus in its inoperative position.

Fig. 2 is a side elevation view of the apparatus in the same position.

Fig. 3 is a front elevation view of the apparatus in its operative position.

Fig. 4 is a vertical section of the apparatus on line 4—4 of Fig. 2, showing the whole inner structure of the same, in its inoperative position.

Fig. 5 is a fragmentary vertical section view, partly in elevation, showing that portion of the apparatus in which the fruit is supported, in its operative position.

Fig. 6 is a fragmentary front elevation view of the lower portion of the apparatus without the detachable portion of the cover, showing the containers for the pulp and the extracted juice.

Figs. 7 and 8 are details respectively showing an outer elevation and a top view of the drill for grating the fruit.

Fig. 9 is a detail of the casing enclosing the draw-gear for the shaft of the rotatory drill, showing also the clutch mechanism for operating the shaft of the juice stirrer.

Fig. 10 is a detail showing in vertical section the containers for the pulp and the extracted juice, with the pulp squeezer arranged therein.

Fig. 11 is an upper plan view of the same containers.

Fig. 12 is a detail showing the top of the pulp container.

Fig. 13 is a detail showing the top of the juice container.

Figs. 14 and 15 are details respectively in upper plan view and diametral vertical section of a cap for grating oranges.

Figs. 16 and 17 are details showing in outer side elevation the compressing and grating disc and the container which are employed for squeezing skinless fruits.

Fig. 18 is an upper plan view of the container for squeezing skinless fruits.

Fig. 19 is a lower plan view of the grating and compressing disc for skinless fruits.

Figs. 20 and 21 are details showing in outer side elevation the holding piece and the pricker used for extracting the milk of a coconut.

Fig. 22 is a detail front elevation view of the same pricker partly in section at its base.

Fig. 23 is a lower plan view of the piece for holding the coconut.

Fig. 24 is a lower plan view of the base of the pricker for opening coconuts.

And Fig. 25 is an upper plan view of the head supporting the pricker for opening coconuts.

This apparatus is composed of a base 1 upon which are two standards 2 spaced from each other and reinforced at their base by foundations 3. This base has suitable holes for fixing it by means of bolts upon a suitable counter, table or furniture. Slidably mounted on the standards 2 is a vertical frame open at its bottom and whose sides 4 are hollow columns guided upon the standards 2, and the bar 5 forming the top of the slidable frame shows at the middle of its lower face a transversal head forming a guide of swallowtail section 6 for the head of similar section 6' formed on the bell 7 used for compressing a fruit, which bell is provided with a series of inner teeth in circular arrangement 8 for holding the fruit without permitting it to be rotated.

The bell 7 receives together with the slidable frame 4, 5, an alternative motion which is caused by manually operating a handle formed at the top of an inverted U-shaped swing-bar 9 pivotally mounted at intermediate points of its branches on horizontal pivots 10 fixed to the hollow columns 4, the branches being pivotally connected at their lower ends to connecting bars 11 which are also connected at their lower ends to horizontal pivots 12 supported on brackets 13 fixed to the foundations 3. In Fig. 2 are respectively shown in full lines and dotted lines the upper and lowest positions of the swing-bar 9 and of the connecting bars 11 corresponding to the upper and lowest positions of the compressing bell 7.

The base 1 shows vertically beneath the slidable frame 4, 5, a circular opening 14 upon which fits a funnel-shaped open base 15 provided with a vertical flange to which is fixed by means of screws 16 the stationary portion of a cylindrical cover horizontally divided into two halves 17 and 18 connected by means of flanges 17' and 18' at their adjacent edges which are secured to each other by means of bolts 19, the other portion of the cylindrical cover one-half 18 being detachable and secured by means of clamps 20 to the stationary portion when the containers for the pulp and the extracted juice are enclosed in the cover.

The upper half 17 of the cylindrical cover is integral with two brackets one solid 23 and another hollow 24 in horizontal alignment, which are connected at the center of the cover by a casing 25 designed to contain a suitable draw-gear. The brackets 23 and 24 project beyond the cylindrical cover 17 and there are provided with vertical flanges 23' and 24' which serve to fix them by means of screws to the standards 2 through a suitable slot in the respective column 4. Within the hollow bracket 24 is rotatorily mounted a horizontal shaft 26 provided within the casing 25 with a bevelled pinion 27 meshing with another bevelled pinion 28 slidably carried by means of a wedge 29 on a vertical shaft 30 rotatorily mounted in journal bearings formed at the upper and lower portions of the casing 25 so that the shaft 30 can slide under the pinion 28 without this pinion 28 failing to mesh with the pinion 27, as the former is pressed upwardly by a coil spring 31 rolled upon the vertical shaft 30 within the casing 25.

The shaft 30 carries at its upper end a head 32 forming a square socket 33 for insertion therein of the square head 33 provided at the lower end of the pear-shaped grating drill 34 provided at its upper end with a sharp point 35 and at its periphery with sharp teeth 34' distributed as saw-teeth in horizontal section, as shown in Figs. 7 and 8 of the drawings. The shaft 30 may be lifted or let down by means of a cam 36 fixed at the end of a horizontal shaft 37 rotatorily mounted on a bracket 38 integrally formed at the top of the casing 25 and through an opening formed in the cylindrical cover 17, said shaft 37 ending outside this cover in a handle 38 for its operation, as shown in Fig. 9 of the drawings. The bottom of the head 32 rests on the cam 36 and when the latter is rotated along with the shaft 37, it causes the head 32 to lift and with the same is lifted the slidable shaft 30 for the purpose explained hereinafter. The shaft 26 is coupled to any power producing means as the shaft of an electric motor or to a shaft manually operated by a handle.

On a recess 39 formed in the funnel-shaped base 15 is mounted a cylindrical container 40 open at its top and which forms at its upper edge a seat with a flange 41 adapted to receive a second cylindrical container 42 open at its top the perforated bottom 43 of which properly forms a strainer, the lower container 40 having a slanting mouth 44 at its front to discharge the strained and stirred juice, and adjacent to said mouth is placed a straining plate in the shape of a segment 45, so that upon inclining the containers the juice coming out through the mouth 44 may be strained again. On bushings 46 and 47 formed on the bottom of both containers 40 and 42 is rotatorily mounted a vertical shaft 48 which is provided with a blade-stirrer 49 within the lower container 40 and said shaft 48 has at its upper end a square-hollow head 50 adapted to couple with another solid square head 51 formed at the lower end of the shaft 30 with which is in vertical alignment said vertical shaft 48, when said shaft 30 is let down by the cam 36. The containers 40 and 42 are respectively provided with handles 52 and 53 positioned at the front of the apparatus and which project outside the detachable half of the cover 18 through a slot 54. The juice dropping from the grated and compressed fruit is guided to the upper container 42 through an inverted conical chute 55 integrally formed with the horizontal brackets 23 and 24.

For cleaning and washing the apparatus, an annular tube provided with lower perforations 56 is arranged in the upper part of the cover 17 and inside thereof, which is in communication through a tube 57 with a water-pipe.

The operation of the apparatus is as follows: a pineapple with its rind, for instance, is taken and cut horizontally in two halves, and one half 58 is placed on the grating drill 34 by pricking it in the sharp point 35. Then the horizontal shaft 26 is put into operation by means of any power supplying means, and upon said shaft 26 rotating, its motion is transmitted to the vertical shaft 30 by means of the bevelled pinions 27, 28, whereupon the drill 34 will rotate. Immediately the bell 7 is caused to descend by grasping with the hand the handle 9 and causing the swing-bar 9 to rotate on its horizontal pivots 10, whereupon the hollow columns 4 will slide down upon the standards 2 until the teeth 8 of the bell prick upon the fruit 58 and retain it in position against rotation. As the drill 34 rotates on its shaft 30, the fruit 58 is grated at the same time that it is compressed by the bell 7 through the downward pressure of the operator's hand, and the fruit juice and pulp are recollected in the upper container 42 through the conical chute 55, and the juice strains through the perforations of bottom 43 and is received in the second container 40 where it is stirred by the blade-stirrer 40. When it is desired to utilize the juice, the detachable half 18 of the cylindrical cover is removed, and by means of the handle 38 the cam 36 is caused to rotate and raise the head 32 of the shaft 30 to disconnect this shaft 30 from the lower shaft 48, whereupon the two containers 42 and 40 can be drawn out. The pulp remaining in the upper container 42 is squeezed and reduced to bagasse by means of a squeezer consisting of a disc 59 provided with an outwards open slot 60 to accommodate on the shaft 48 (Fig. 10) and beneath a flange 61 formed in the inner periphery of the container 42, the disc 59 having a handle 63 by means of which a downward pressure is made to cause the disc 59 to compress the pulp 64 gathered in said container 42.

For extracting the juice of an orange, a grating cap 65 is used, which has peripherial teeth (Figs. 14 and 15) and has at the top an opening 65' through which it may be placed on the point 35 of the drill 34, as shown in dotted lines in Fig. 7 of the drawings.

When it is desired to extract the juice from skinless fruits, the drill 34 is replaced by a cylindrical container 66 (Figs. 16, 17, 18 and 19) provided with perforations in its side periphery and bottom, within which container the fruit is placed, and the bottom of said container 66 has a lower square head 68 adapted to engage the head 32 of the shaft 30, and instead of the bell 7 a grating disc 69 is used, which is provided with radial teeth 70 on its lower face and a fibre washer is provided thereon to soften the rotating motion of the container 66 on the grating disc which has a central stem 72 and a swallow-tail section head 73 to slidably engage the guide 7 at the top of the slidable frame 4, 5.

And when it is desired to extract the milk of a coconut, instead of the drill 34 is employed a pricker 74 (Figs. 20 to 25) which has in its body a hollow space 75 open toward the sides and the bottom 76 of which forms a central protuberance with slanting surfaces toward the sides to serve as a guide for the juice which passes to the hollow space 75 through a triangular vane 77 laterally formed at the point of the pricker 74. The pricker 74 has an annular base provided with a downward flange 78 at the inner periphery of which are formed two diametrically opposed vertical ribs 79 adapted to engage two diametrically opposed groves 80 formed on the head 32 of the shaft 30. In that case the bell 7 is substituted to a disc 81 provided with four teeth 82 to retain in position the coconut and having a swallow-tail section head 83 to be slidably engaged in the guide 6 of the top of the slidable frame 4, 5.

Within the lower container 40 crushed ice and sugar may be added to the juice, in order to serve it directly to the consumer, once stirred.

This aparatus has great sanitary conditions, as the operative parts thereof are entirely covered whereby the direct contact of the operator's hand with the fruit while the juice of same is extracted, is avoided.

It is obvious that the construction details of the apparatus can be varied within certain limits, without altering the essential character of the invention which is such as claimed hereinafter.

What we claim is:

1. Apparatus for extracting fruit juice, comprising a base, a cylindrical cover on the base having two horizontal opposed brackets, a casing centrally supported within the cover by said brackets, a horizontal shaft rotatably mounted in a bearing with which one of the brackets is provided, a vertical shaft rotatably and slidably mounted through said casing, gears connecting the horizontal and vertical shafts within the casing, a grating drill detachably mounted on the upper end of the vertical shaft, a chute beneath the casing and the supporting brackets within the cover, a pair of opposed standards outside the cover and to which the two supporting brackets are connected, a pair of hollow columns slidably mounted on said standards and connected at the top by a bar, a compressing bell detachably mounted on the central portion of said bar to cooperate with the drill, a receiving container for the pulp and another receiving container for the juice, the former superposed to the latter and both placed directly beneath the said chute, the former having its bottom perforated to strain and the latter having a blade stirrer whose vertical shaft projects beyond the former container and has at its upper end a means to detachably connect with the lower end of the vertical shaft of the drill, an inverted U-shaped bar the branches of which are pivotally connected to the hollow columns above mentioned, brackets secured to the base, connection bars connecting the lower ends of said inverted U-shaped bar to these brackets, and means for rotating said horizontal shaft from any power supply source.

2. Apparatus for extracting fruit juice, comprising a base, a cylindrical cover on the base and having horizontally opposed brackets, said cylindrical cover having a portion laterally detachable immediately above the base, a casing centrally supported within the cover by said brackets, a horizontal shaft rotatably mounted in one of said brackets, a vertical shaft rotatably and slidably mounted through said casing, gears connecting both horizontal and vertical shafts within the casing, a grating drill detachably mounted on the upper end of the vertical shaft, a chute beneath the casing and supporting brackets within the cylindrical cover, a pair of opposed standards outside the cover and connected to the ends of said supporting brackets, a pair of hollow columns slidably mounted on said standards and connected at the top by a bar serving as a handle, a compressing bell detachably mounted on the central portion of said bar to cooperate with the drill, a receiving container for the pulp dropping through the chute and another receiving container for the juice, the former superposed to the latter and both placed directly beneath said chute, the former having its bottom perforated to strain and the latter having a lateral mouth provided with a segmental perforated plate adjacent thereto and a blade stirrer whose vertical shaft projects upwards beyond the former container and has at its upper end means to detachably connect with the lower end of the vertical shaft of the drill, cam means operable from outside the cylindrical cover to ascend the vertical shaft carrying the drill, an inverted U-shaped bar the branches of which are pivotally connected to the hollow columns above mentioned, brackets secured to the base, connection bars connecting the lower ends of said inverted U-shaped bar to these brackets, and means for rotating said horizontal shaft from any power supply source.

SANTIAGO ESTRADA.
ENRIQUE MAURI.
ARMANDO IVEY.